United States Patent [19]

Rosenquist et al.

[11] 4,371,650
[45] Feb. 1, 1983

[54] FLAME RETARDANT POLYCARBONATES

[75] Inventors: Niles R. Rosenquist, Evansville; John A. Tyrell, Mt. Vernon, both of Ind.

[73] Assignee: General Electric Company, Mt. Vernon, Ind.

[21] Appl. No.: 247,941

[22] Filed: Mar. 26, 1981

[51] Int. Cl.³ .............................................. C08K 5/42
[52] U.S. Cl. .................................... 524/162; 252/609
[58] Field of Search ................... 260/45.85 S, 45.7 S; 524/162; 252/609

[56] References Cited

U.S. PATENT DOCUMENTS 3,953,399  4/1976  Mark ............................. 260/45.85 S
3,978,024  8/1976  Mark ............................. 260/45.85 T Primary Examiner—Veronica P. Hoke
Attorney, Agent, or Firm—Martin B. Barancik; William F. Mufatti

[57] ABSTRACT

Polycarbonates are flame retarded with novel mixture of metal salts of sulfonated di-p-cumyl-phenyl carbonate.

10 Claims, No Drawings

4,371,650

FLAME RETARDANT POLYCARBONATES

BACKGROUND OF THE INVENTION

One of the significant problems inhibiting the further use of synthetic materials is the innate flammability of certain materials, particularly plastics. Recently, certain additives have been added to plastics which provide new compositions that have substantially incresed resistance to flammability. Such a group of additives has been discovered for the polycarbonate materials. Examples of such additives are found in U.S. Pat. No. 3,978,024 which discloses the use of metal salts of phenol ester sulfonic acids in aromatic polycarbonate compositions and U.S. Pat. No. 3,953,399 which discloses the use of the metal salt of sulfonic acids of aromatic carboxylic acids and esters in aromatic polycarbonate compositions. These additives are in general very useful and have successfully extended the uses of aromatic polycarbonates into areas requiring lower levels of inflammability. However, certain properties of the aromatic polycarbonate can be detrimentally affected by the addition of these additives. The presence of the flame retardant additive can bring about a haze in transparent polymeric compositions. Furthermore, destabilization of the composition as shown by increased yellowing index values at high molding temperatures can also occur.

A new group of flame retardant additives has been discovered which maintain or less detrimentally affect the properties of the aromatic carbonate composition than some other flame retardant additives. These new additives are effective at relatively low loading levels.

SUMMARY OF THE INVENTION

In accordance with the invention, there is a new composition which comprises a polymer having a repeating unit of Formula I (see chart at last page of specification for all formulae)
wherein Ar is an aromatic group, in admixture with a flame retardant effective amount of a mixture of compounds, said mixture comprising at least 2 compounds of Formula II
wherein M is an alkali or alkaline earth metal, and a, b, c, and d are the same or different and are 0, 1 or 2 with the proviso that at least one of a, b, c or d is 1 or 2.

A further aspect of the invention is a mixture of compounds, each compound of the mixture being a compound of Formula II
wherein M is an alkali or alkaline earth metal, and a, b, c and d are the same or different and are 0, 1 or 2 with the proviso that at least one of a, b, c or d is 1 or 2.

DETAILED DESCRIPTION OF THE INVENTION

The phenyl ester sulfonic acid salt flame retardant additives of this invention are preferably of the Formula II structure wherein M is an alkali metal. Another preferred group of compounds of Formula II are the compounds wherein none of a, b, c and d is 2.

Examples of alkali and alkaline earth metals include sodium, potassium, calcium and barium. Alkali metals are preferred. Of the generally employed alkali metals, potassium is preferred because of its reduced propensity to cause haze.

As used throughout the specification and claims the term "mixture" denotes two or more of the compounds of Formula II in a single composition.

The polymer to which the novel additive mixture is added is prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3', 5'-tetrabromo-4,4'-dihydroxydiphenyl) propane, (3,3'-dichloro-4,4'-dihydroxyphenyl) methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishalo-formates of ethylene glycol, neopentyl glycol, polyethylene glycol, etc.). While other carbonate precursors will occur to those skilled in the art, carbonyl chloride, also known as phosgene, is preferred.

The polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, primary and secondary amines, etc.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethyl ammonium bromide, cetyl triethyl ammonium bromide, tetra-n-heptyl ammonium iodide, tetra-n-propyl ammonium bromide, tetramethyl ammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

The mixture of compounds used as the flame retardant additive in the polymeric composition is readily prepared by reacting di-p-cumylphenyl carbonate with sulfur trioxide. The quantity of sulfur trioxide employed directly affects the number and placement of the sulfonic acid moieties on the molecule. Also of significance is the length of reaction time and severity of reaction conditions with respect to number and placement in the sulfonic acid moieities. The reaction mixture is neutralized with an alkali or alkaline earth hydroxide, thereby converting the acid to the metal salt.

The temperature of the sulfonation reaction is not unduly significant and may vary from about 25° C. to about 175° C. It is partially dependent upon whether the reaction is without solvent or with solvent. The duration of the sulfonation reaction should be of sufficient length to sulfonate.

The composition of the invention is simply prepared by adding a flame retardant effective amount of an additive of Formula II to the polymer having a repeating unit of Formula I. This addition can be made to the powder prior to extruding or during the melt stage.

An effective flame retardant amount of the additive is employed. Flame retardancy with quantities as low as 0.0025 or even lower can be observed, although it is preferably to use a quantity of about 0.005 or higher. The more additive in the composition, the greater the negative effect on the transparency of the polymer and the yellowing index; however, the greater flame retardancy also shown. Therefore, the maximum amount of additive is dependent upon the characteristics required in the specific polycarbonate application. All percentages are based on weight percent of the polymer.

The following examples are intended to illustrate the invention and are not intended to narrow the broad inventive concept.

EXAMPLE 1

To a stirred melt of di-p-cumylphenyl carbonate, at 115°–145° C., under a nitrogen atmosphere was added sulfur trioxide in a one to one molar ratio to the carbonate, over a thirty minute time period. The reaction temperature was maintained between 115°–145° C. during the addition and for an additional 30–60 minutes after the addition. The resultant dark viscous melt was added to deionized water, and the pH adjusted to 7 by addition of aqueous potassium hydroxide solution. The water was removed in vacuo. Trituration of the resultant solids with acetone, and subsequent filtration yielded the potassium sulfonates as a free flowing, white powder. Both the IR and NMR spectra are consistent with the sulfonation products.

EXAMPLE 2

In like manner as in Example 1, a mixture of compounds made from a reactant molar ratio of 1.5 to 1.0 sulfur trioxide to the carbonate is prepared.

EXAMPLE 3

In like manner as in Example 1, a mixture of compounds made from a reactant molar ratio of two to one sulfur trioxide to the carbonate is prepared.

EXAMPLE 4

To a bisphenol-A polycarbonate resin is added about 0.1 part by weight per hundred parts by weight of resin of a phosphite color stabilizer mixed with an epoxy stabilizer. A portion of the stabilized resin is set aside as the control and varying amounts of the product of Example 1, 2, and 3 are added to the resin. This stabilized resin product is then fed to an extruder operating at a temperature of about 500° F. to extrude the resin into strands and the extruded strands are chopped into pellets. The pellets are then injection molded at about 570° F. into test bars measuring about 2½"×½"×⅛" and into test plaques measuring 3"×2" with thickness of ⅛" over 2"×2" of the surface and thickness of 1/16" over 1"×2" of the surface.

Flame retardancy is enhanced in the test bars with the compounds at each weight level tested.

The test plaques were used for the % haze and Yellowness Index (YI) tests. The % haze was determined by ASTM D1003 on the 125 mil (⅛" thick parts) on a Pivotal-sphere Hazemeter made by Gardner Lab Inc., Bethesda, Maryland. The YI was determined by ASTM D1925 on ⅛" thick parts on a Model XL-23 colorimeter made by Gardner Lab Inc., above. Below are the results.

TABLE 1

| FLAME RETARDANT MIXTURE EXAMPLE NO. | QUANTITY WT. % | % HAZE | YI |
|---|---|---|---|
| 1 | — | .6 | 4.0 |
| 1 | .03 | .4 | 3.8 |
| 1 | .05 | .6 | 4.6 |
| 2 | — | 1.0 | 3.7 |
| 2 | .005 | .9 | 4.0 |
| *2 | .01 | .7 | 3.9 |
| 2 | .02 | .9 | 4.1 |
| *2 | .01 | .8 | 4.1 |
| 3 | — | .4 | 4.5 |
| 3 | .01 | .3 | 4.0 |
| 3 | .05 | .4 | 5.2 |

*Different preparations.

The results of the Table clearly demonstrate the low percent haze and yellowness indices each of the flame retardant mixtures have at various loading levels. The values obtained by the flame retardant mixtures are very similar to, if not the same or lower than, the percent haze and yellowness obtained with the control, no flame retardant present.

CHART

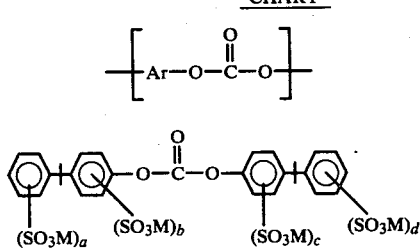

FORMULA I

FORMULA II

What is claimed is:

1. A composition which comprises a polymer having a repeating unit

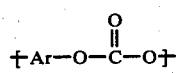

wherein Ar is an aromatic group, in admixture with a flame retardant effective amount of a mixture of compounds, said mixture comprising at least 2 compounds of the formula

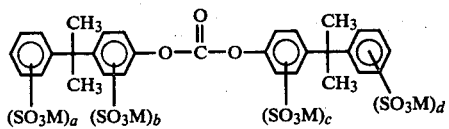

wherein M is an alkali or alkaline earth metal, and a, b, c and d are the same or different and are 0, 1 or 2 with the proviso that at least one of a, b, c or d is 1 or 2.

2. A composition in accordance with claim 1 wherein M is an alkali metal.

3. A composition in accordance with claim 1 wherein M is potassium.

4. A composition in accordance with claims 1, 2 and 3 wherein none of a, b, c and d is 2.

5. A composition in accordance with claims 1 and 2 wherein the polymer is a homopolymer.

6. A composition in accordance with claim 5 wherein the aromatic group is derived from bisphenol-A.

7. A composition comprising a mixture of compounds, each compound of the mixture being at least 2 compounds of the formula

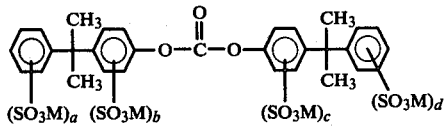

wherein M is an alkali or alkaline earth metal and a, b, c and d are the same or different and are 0, 1, or 2 with the proviso that at least one of a, b, c, or d is 1 or 2.

8. A claim in accordance with claim 7 wherein M is an alkali metal.

9. A claim in accordance with claim 7 wherein M is potassium.

10. A claim in accordance with claims 7 and 8 wherein none of a, b, c and d is 2.

* * * * *